US006424647B1

(12) United States Patent
Ng et al.

(10) Patent No.: US 6,424,647 B1
(45) Date of Patent: Jul. 23, 2002

(54) METHOD AND APPARATUS FOR MAKING A PHONE CALL CONNECTION OVER AN INTERNET CONNECTION

(75) Inventors: Ede Phang Ng; Loh Eng Choon, both of Singapore (SG); Steven D. Edelson, Wayland, MA (US)

(73) Assignee: MediaRing.Com Ltd., Singapore (SG)

( * ) Notice: Subject to any disclaimer, the term of this patent is extended or adjusted under 35 U.S.C. 154(b) by 0 days.

(21) Appl. No.: 09/240,674

(22) Filed: Feb. 2, 1999

Related U.S. Application Data

(63) Continuation-in-part of application No. 08/963,543, filed on Nov. 3, 1997, now Pat. No. 6,243,376, which is a continuation-in-part of application No. 08/910,887, filed on Aug. 13, 1997, now Pat. No. 6,373,835.

(51) Int. Cl.$^7$ .............................................. H04L 12/66
(52) U.S. Cl. ....................................... 370/352; 370/356
(58) Field of Search ................................. 370/351, 352, 370/353, 354, 355, 356, 357, 401, 389, 404, 427; 379/90.01, 93.01, 93.05, 93.09, 100.15, 100.11

(56) References Cited

U.S. PATENT DOCUMENTS

| 5,452,289 | A | | 9/1995 | Sharma et al. ............. 370/32.1 |
| 5,471,470 | A | | 11/1995 | Sharma et al. ................ 370/81 |
| 5,600,649 | A | | 2/1997 | Sharma et al. .............. 370/435 |
| 5,764,627 | A | | 6/1998 | Sharma et al. .............. 370/271 |
| 5,907,547 | A | * | 5/1999 | Foladare et al. ............ 370/352 |
| 6,011,794 | A | * | 1/2000 | Mordowitz et al. ......... 370/389 |
| 6,014,687 | A | * | 1/2000 | Watanabe et al. ........... 370/351 |
| 6,131,121 | A | * | 10/2000 | Mattaway et al. .......... 709/227 |
| 6,141,341 | A | * | 10/2000 | Jones et al. ................. 370/352 |
| 6,198,738 | B1 | * | 3/2001 | Chang et al. ............... 370/352 |

FOREIGN PATENT DOCUMENTS

| EP | 0 781 016 A2 | 6/1997 |
| WO | WO 96/38018 | 11/1996 |
| WO | WO 97/35416 | 9/1997 |
| WO | WO 98/11704 | 3/1998 |
| WO | WO 98/30008 | 7/1998 |
| WO | WO 98/35481 | 8/1998 |
| WO | WO 99/09732 | 2/1999 |

* cited by examiner

Primary Examiner—Ajit Patel
(74) Attorney, Agent, or Firm—Fenwick & West LLP

(57) ABSTRACT

The present invention includes a method or Internet phone for automatically dialing up a phone call connection across an Internet connection. Initially the caller manually dials a recipient's telephone number, and once the telephone call connection is made, the caller party's Internet phone automatically starts a dialing routine which notifies the recipient party's Internet phone that a phone call connection over an Internet connection is desired. The dialing may be a differential ringing sequence, a differential timing sequence or a single ringing interval. Upon the dialing routine being detected by the recipient party's Internet phone, the parties end the telephone connection and proceed to make separate connections to the Internet, including a connection to a Lightweight Directory Access Protocol (LDAP). The caller party and recipient party Internet phones submit information related to their respective Internet protocol address and telephone numbers. The caller party additionally submits information related to the recipient Internet phone's telephone number. Then the Internet connection for the intended phone call is automatically completed. Alternatively, the differential dialing routine can be performed by a knocking server on the Internet, and a directory server on the Internet can match callers and recipients by their respective telephone numbers. Additionally, the knocking server permits caller equipment to be without dialing capabilities as these are now at the knocking server.

37 Claims, 8 Drawing Sheets

METHOD AND APPARATUS FOR MAKING A PHONE CALL CONNECTION OVER AN INTERNET CONNECTION

RELATED APPLICATION

This is a continuation-in-part of application Ser. No. 08/963,543, entitled METHOD AND APPARATUS FOR MAKING A PHONE CALL CONNECTION OVER AN INTERNET CONNECTION, filed Nov. 3, 1997, now U.S. Pat. No. 6,243,378 which is a continuation-in-part of application Ser. No. 08/910,887, entitled METHOD AND APPARATUS FOR MAKING A PHONE CALL CONNECTION OVER AN INTERNET CONNECTION, filed Aug. 13, 1997 now U.S. Pat. No. 6,373,835.

FIELD OF THE INVENTION

This invention relates to Internet systems and more particularly to a method and apparatus for automatically connecting a remote processor to the Internet for setting up a phone call connection over an Internet connection.

BACKGROUND OF THE INVENTION

Typically, voice communication over the Internet works by using the combination of networks that make up a user Internet connection rather than the telecommunications network provided by a local or long distance company. Instead of talking into a telephone, a user speaks into a personal computer (PC) equipped with a microphone, speaker and a sound card. On the Internet, the voice traffic is treated as just a particular kind of data. The voice traffic, converted into bit form, is transmitted as data packets under the existing Internet protocol suites, TCP/IP (Transmission Control Protocol/IP), that facilitate the reliable exchange of data between computers over the Internet. The TCP program layer divides the voice-based data file into one or more packets, numbers the packets, and then forwards the packets to the IP program layer. The IP program layer handles the addressing of each data packet that is transmitted from one computer to another on the Internet. Essentially, the TCP/IP protocol suites manage the assembly and reassembly of data into data packets that are transmitted and received across the Internet.

Typical connection procedures across an Internet require configuration of computer hardware with a software routine which allows connection with an Internet service provider, and another software routine which accesses a server configured computer across the Internet via established protocols. These Internet connection procedures, which have evolved with computer to computer communications in mind, lack the automated phone call connection procedures available with a telephone call connection. To make a telephone call connection, a caller simply dials a telephone number of a recipient.

Accordingly, there is a need to provide a method and apparatus for automatically establishing a phone call over an Internet connection.

SUMMARY OF THE INVENTION

The present invention provides a method for automatically establishing a phone call over an Internet connection. The method includes using a dialing routine with a telephone call connection to notify of an intended phone call over an Internet connection by caller party communication equipment to recipient party communication equipment in response to a manual dialing of the telephone call connection at the caller party communication equipment. Then each of the caller and recipient party communication equipment automatically undertake to make an Internet connection and then a connection to a directory service on the Internet. The caller party communication equipment automatically provides information related to its Internet protocol address and a unique identifier or telephone number, and related to the recipient party communication equipment's unique identifier or telephone number. The recipient party communication equipment automatically provides information related to its Internet protocol address and unique identifier or telephone number. Then the caller and recipient party communication equipment automatically complete the Internet connection for the intended phone call.

In an alternative aspect of the present invention, there is provided a method for automatically establishing a phone call over an Internet connection, wherein a caller party automatically dials a telephone number of a recipient party to establish a telephone phone call connection. The caller party automatically initiates a dialing routine to notify the recipient party of an intended phone call connection across an Internet connection. The caller and recipient parties automatically end the telephone call connection in response to the recipient party detecting the dialing routine by the caller party. The caller and recipient parties each automatically undertake to make a separate connection with an Internet service provider and then make a connection to a directory service on the Internet. Each of the caller and recipient parties automatically provide information related to their respective Internet protocol address and unique identifier or telephone number, and the caller party submits information related to the recipient party's unique identifier or telephone number. Each of the caller and recipient party automatically complete the Internet connection for the intended phone call connection.

In a further aspect of the present invention, there is provided an Internet phone. The Internet phone includes memory means for storing executable programs including operating routines, Internet related protocols, a dialing routine for selective automatic call dialing and call detection across a telephone call connection to notify of an intended phone call over an Internet connection, and a connection routine for automatically establishing the Internet connection for the intended phone call between a selectively intended caller and recipient of the intended phone call. The connection routine is responsive to the dialing routine, and the dialing routine is responsive to a manual dialing of the telephone call connection. A processor means is coupled to the memory means for downloading and processing the executable programs. A display means is coupled to the processor means for indicating when the Internet connection is established. A relay means, for selectively switching between an audio device and a telephone switching network, is responsive to the processor means. An audio interface means is coupled between the relay means and the processor means for selectively converting an audio signal from an audio device into a digital signal for the processor means and converting a digital signal from the processor means into an audio signal for the audio device. The audio interface means is responsive to the processor means. A telephone network interface means is coupled between the processor means and the relay means for selectively converting a digital signal from the processor means into an analog signal for transmission across the telephone switching network, and converting an analog signal received from across the telephone switching network into a digital signal for the processor means. The telephone network interface means is responsive to the processor means.

In a further aspect of the present invention, there is provided a method for establishing a phone call over an Internet connection. The method includes making an Internet connection by caller party communication equipment intending to establish a phone call connection over the Internet connection with recipient party communication equipment, providing by the caller party communication equipment information related to the caller party communication equipment's Internet Protocol address and unique identifier or telephone number and information related to the recipient party communication equipment's unique identifier or telephone number to a directory server and knocking server on the Internet connection, notifying automatically by the knocking server to the recipient party communication equipment of an intended phone call connection over the Internet connection, the notifying being a dialing routine over a telephone call connection to the recipient party communication equipment, making an Internet connection by the recipient party communication equipment in response to the recipient party communication equipment detecting the dialing routine by the knocking server, providing automatically, by the recipient party communication equipment, the recipient party communication equipment's Internet protocol address and unique identifier or telephone number to the directory server; and completing automatically the Internet connection between the caller and recipient party communication equipment for the intended phone call.

BRIEF DESCRIPTION OF THE DRAWINGS

Preferred features of the present invention can be best understood by reference to the description in conjunction with the following drawing figures, with like reference numerals indicating like components or steps, in which.

DETAILED DESCRIPTION OF PREFERRED EMBODIMENTS

Figure 1:
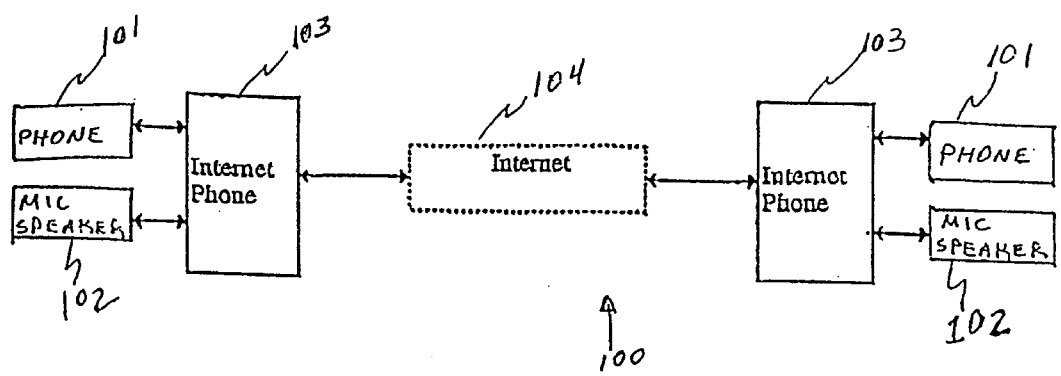
FIG. 1 is a block diagram of an Internet based phone system configuration in accordance with the present invention.

Referring to FIG. 1 there is shown a block diagram of an Internet phone system configuration in accordance with the present invention. One caller or recipient party communication equipment end consists of an Internet phone 103 connected to an external phone 101 or a microphone-speaker set 102 (i.e. audio device). The other recipient or caller party communication equipment end includes an identical Internet phone 103 connected to an external phone 101 or microphone-speaker set 102. The caller and recipient party communication equipment communicate over an Internet connection 104. A caller party Internet phone 103 processes voice deliveries from the phone 101 or microphone-speaker 102 set into a data packet format suitable for transmission over the Internet 104. The recipient party Internet phone 103 processes the incoming data packet format into audio signals reproducible as voice through the phone 101 or microphone-speaker set 102. Full duplex communications are achieved by each Internet phone 103 transmitting and receiving over the Internet 104 as well as converting voice to data packets or data packets to voice.

The Internet 104, over which the Internet phones 103 transmit and receive, refers to a collection of networks and gateways interconnecting dissimilar networks that transfer information under the TCP/IP (Transmission Control Protocol/Internet Protocol) suite of protocols. The TCP/IP is a two layer program that each Internet user uses to transmit or receive over the Internet 104. The TCP (Transmission Control Protocol) manages the packaging of data into packets that get routed on different paths across the Internet and reassembled at their destination. The IP (Internet Protocol) handles the address part of each data packet so that it is routed to the right destination.

Although the TCP and IP protocols are the most important, TCP/IP is really a suite of protocols including SLIP (Serial Line Internet Protocol) and PPP (Point-to-Point Protocol). SLIP is used for communications between two machines that were previously configured for communication with each other. For example, an Internet Service Provider (ISP) may provide a user with a SLIP connection so that one ISP's server can respond to the user's requests, pass them on to the Internet, and forward the user's requested Internet responses back to the user. A PPP connection with an ISP is like the SLIP connection. However, PPP is usually preferred over SLIP because PPP can handle synchronous as well as asynchronous communication. PPP can share a line with other users and has error detection which SLIP lacks.

Figure 2:
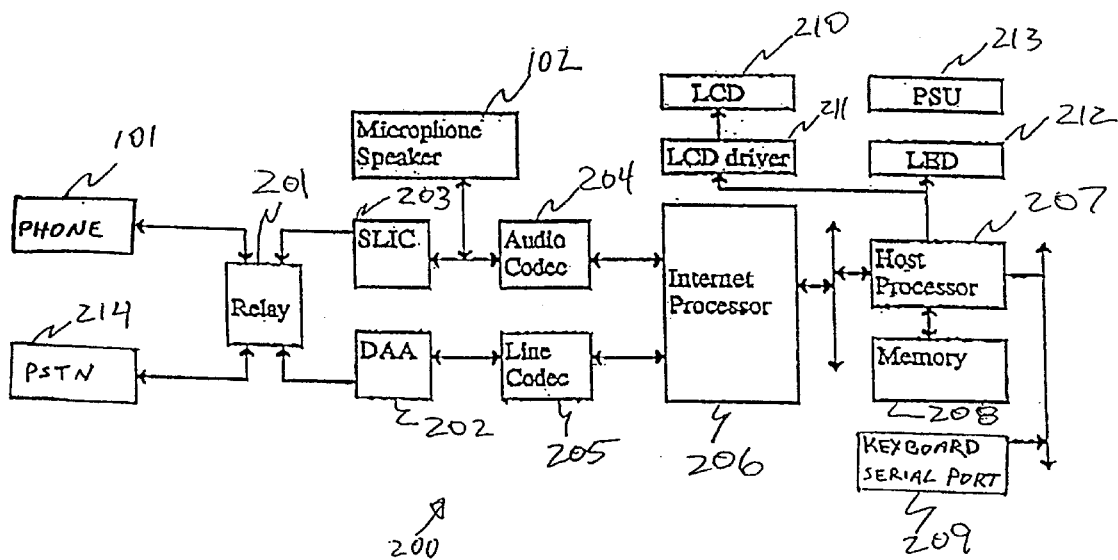
FIG. 2 is a block diagram detailing an Internet phone set-top box shown in FIG. 1.

Referring now to FIG. 2 there is shown a block diagram 200 detailing the Internet phone 103 discussed with respect to FIG. 1. The external phone 101 is connected to a relay 201 which is operable in a normal mode and an Internet mode. In the normal mode, the external phone 101 becomes connected to the Public Switched Telephone Network (PSTN) 214 and allows the user to make or receive local or long distance calls directly through the PSTN. In the Internet mode, the external phone 101 or microphone-speaker set 102 is connected to SLIC (Subscriber Loop Interface Circuitry) and used as an audio headset.

Coupled between the relay 201 and an Internet processor 206, is an audio interface circuitry which includes the SLIC (Subscriber Loop Interface Circuitry) 203, and an audio range multiplexer and coder-decoder (Audio Codec) 204. The audio interface circuitry converts an audio signal from the phone 101 or microphone-speaker set 102 (i.e., audio device) into a digital format suitable to be processed by the Internet processor. Also, the audio interface circuitry converts a audio digital signal from the processor into an audio signal that is reproducible through the phone 101 (or microphone-speaker set 102) as voice.

The SLIC 203 is an integrated circuit, widely used as an interface in the telephone switching networks, that provides what is known as the BORSCHT functions in telephony (Battery Feed, Over-voltage Protection, Ringing, Signaling Coding, Hybrid and Test). The SLIC 203 converts 2-wire circuit analog audio signals received from the audio device (i.e. phone 101) into 4-wire circuit analog audio signals. The SLIC 203 also converts received 4-wire circuit analog audio signals back into 2-wire circuit analog audio signals which are sent to the phone 101 (or microphone speaker set 102). Because phones 101 send and receive on a 2-wire pair and the audio decoder-encoder 204 send and receive between each other on 4-wire circuits, the SLIC 203 includes a so-called hybrid network. This hybrid network converts the 2-wire audio into separate send and receive paths in a 4-wire line. The audio multiplexer or Codec 204 converts the 4-wire circuit analog signal from the SLIC 203 or microphone-speaker set 102 into a signal which is encoded by the Codec 204. The Codec 204 preferably uses a pulse code modulation (PCM) technique, which is a method of modulation in which signals are sampled and converted to digital words that are then transmitted serially. Most PCM systems use either 7- or 8-bit binary codes. There are, however, several standards for PCM coding: most common are µ-Law in North America and A-Law in Europe (both based on logarithmic conversion of the signal). Also, the Codec and audio multiplexer 204 decode and de-multiplex, respectively, digital signals coming from the Internet processor 206, to provide an analog signal suitable for the SLIC 203 to process and send to the phone 101 or microphone-speaker set 102. Further configuration and function details of the SLIC 203 and Audio/Codec 204 are well known to those of ordinary skill in the art and need not be discussed in greater detail herein.

Also coupled between the relay 201 and the Internet processor 206 is telephone network interface circuitry, which converts the digital audio from the Internet processor 206 into an analog format suitable for transmission across the PSTN 214. The telephone network interface circuitry also converts an analog signal received from across the PSTN 214 into a digital format suitable for the Internet processor 206. The telephone network interface circuitry includes a DAA (Data Access Arrangement) 202 and a Line Codec (Coder-Decoder) 205. The DAA 202 is a universal 2 to 4 wire hybrid circuitry interface to the PSTN 214 that provides device surge protection, line impedance matching, call process detection and 2-wire to 4-wire hybrid conversion. The Line Codec 205 is a high performance 16 bit linear audio range, analog-to-digital and digital-to-analog converter (ADC and DAC). Further configuration and function details of the DAA 202 and Line Codec 205 are well known to those of ordinary skill in the art and need not be discussed in greater detail herein.

The Internet processor 206 is a high performance Digital Signal Processing (DSP) chip operable to process executable programs such as modem (Modulation-Demodulation) algorithms including V.80 and V.34+, speech related algorithms including G.723.1 and G.729, and acoustic echo cancellation algorithms.

Modem algorithms enable communications over a standard telephone network line in the PSTN by converting digital signals to analog and vice versa. Modem standards are set by the International Telecommunication Union (ITU) and assure compatibility between users transmitting and users receiving, and vice versa. The V.34+ standard is an ITU recommended standard for transmission rates up to 33,600 baud. The V.80 standard is an ITU recommended standard, which provides for in-band signaling and synchronous data modes that enable users to exchange not only voice and data, but also video, over a single analog phone line. The three main functions of a modem under the V.80 standard are: synchronous data stream run on asynchronous modem connections, rate adjustments based on line conditions, communications of lost data packets to help keep real time audio and video flowing to both sides of a communication loop.

Speech related algorithms provide speech coding and decoding to facilitate transmissions over the analog based telephone lines of the PSTN. The speech algorithm standard G.7231, an ITU recommended standard, is a dual rate speech coder for multi-media communications transmitting at 5.3 and 6.3 kilobits per second. The ITU recommended G.729 standard is a speech coding and decoding standard that provides 4 kHZ speech band width at a bit rate of 8 Kilobits per second. The standard specifies a Code Excited Linear Predictive (CELP) coder that uses an algebraic code-book to code the excitation signal. The code operates on speech frames of 10 milisec (80 samples at an 8 kHZ sample rate), completes the long-term predictor coefficients, and operates in an analysis-by-synthesis loop to find the excitation vector that minimizes the perceptually weighted error signal.

The Internet Processor 206 is bidirectionally coupled to a host processor 207 with on-board memory 208. The on-board memory is preferably EEPROM (Electrically Erasable Programmable Read Only Memory), but other non-volatile memory types may be used. On top of the operating system, the targeted executable routines or programs for the host processor 207 are the Internet related functions such as TCP, IP, PPP, etc. Upon the Internet phone 103 being powered on, the host processor 207 downloads, from memory 208, all the necessary host processor executable routines to its instruction and data memory space. The host processor 207 also downloads and transfers the Internet processor's 206 executable routines from the memory 208 to the Internet processor's 206 on-chip instruction and data memory space. After the system executes diagnostic and initialization routines, the Internet phone 103 is operator ready. It is to be noted that different processor and memory configurations are possible for carrying out the above detailed functions. For example a single processor with parallel processing capabilities can be used to process all the executable programs and routines processed by the Internet processor 206 and host processor 207.

The host processor 207 drives an LCD 210 (Liquid Crystal Display) which is an ASCII character display. The LCD 210 displays the mode of operation, (normal or Internet), call ID status of the call progress, and other information pertaining to the operations of the Internet phone 103. The host processor also drives a total of six (6) LED (Liquid Emitting Diode) indicators: power Internet On-Line, call progress, transmit audio, receive audio, and system diagnostic check. The power indicator, when lit, notifies if the power supply unit 213 in the Internet phone 103 has been activated. The Internet On-Line indicates if the Internet phone 103 is connected to the Internet 104. Call progress indicates if calling procedures are being undertaken. Transmit audio, when blinking, indicates that the Internet phone 103 is transmitting audio to a remote Internet phone 103. Receive audio, when blinking, indicates that the Internet phone 103 is receiving audio from a remote Internet phone 103. When the system diagnostic check is lit, the Internet phones 103 internal diagnostic routines have determined that the Internet phone 103 is in good condition and operable.

The Internet phone 103 is provided with a power on-off switch, an Internet call/auto-answer switch, a call toggle switch, a serial port 209, and a general interface port. The Internet call/auto-answer switch provides two functions: as a caller device, the switch indicates the in-coming phone call is through the Internet 104, and as a receiver, the switch indicates that the Internet phone 103 will be automatically connected to the Internet 104 if an Internet routed phone call is detected. The call toggle switch supports call waiting services and allows the user to toggle audio conversations with two parties. The general interface port is an 8/16 slot bus interface which allows for future enhancement. The power switch activates the power supply unit 213, preferably a 12 Volt DC, 1 Amp unit.

The above discussed hardware and software configuration of the Internet phone 103 also includes a link control protocol routine (i.e., program) that provides for four modes of operation as follows:

| Mode | Power | Internet Call/ Auto-Answer | Analog Call | Internet Call |
|---|---|---|---|---|
| 1 | Off | Don't Care | Yes | No |
| 2 | On | Off | Yes | Yes {Both parties need to be manually connected to Internet} |
| 3 | On | On | Yes | Yes {Both parties will be automatically connected to Internet} |
| 4 | On | On | Yes | Yes {Both parties will be automatically connected to Internet} |

In mode 1 the Internet phone 103 is in a sleeping mode in that it is by-passed from the Internet 104 and directly connected to the PSTN. In mode 1, all incoming or outgoing analog calls are directly connected to the PSTN.

Figure 3:
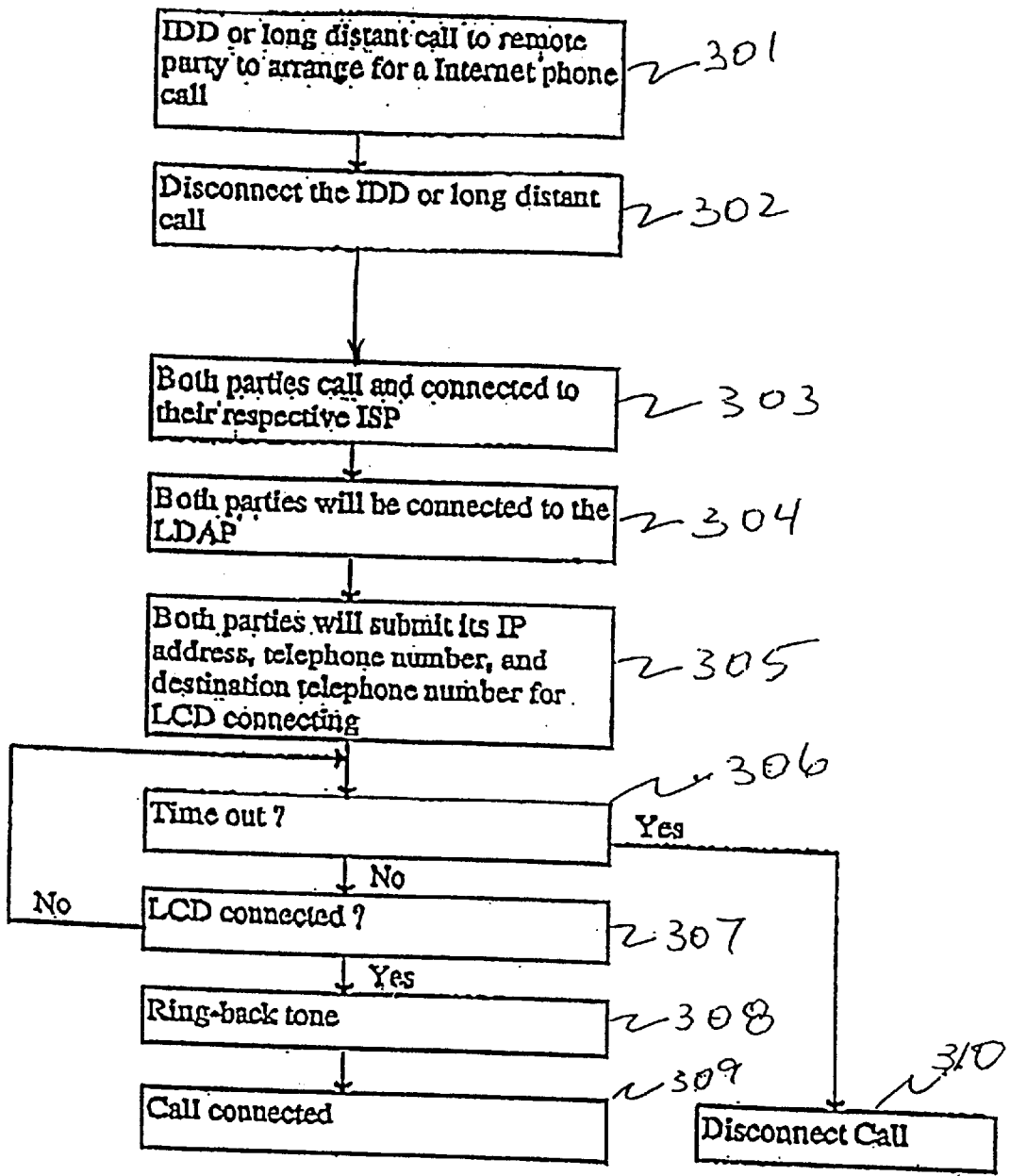
FIG. 3 is a flow chart of a manual Internet phone call setup for the Internet phone set-up box shown in FIG. 2.

In mode 2, both Internet phones 103 need to be manually connected to the Internet 104. The manual Internet phone call set up and tear down procedure is detailed by the flow chart 300 shown in FIG. 3. In mode 2, two phone calls are required to setup the connection over the Internet 104. Initially, the calling party manually calls the recipient party by an International Direct Dial (IDD) call service or long distance call service to verbally indicate that an Internet phone call is required in step 301. Upon agreement by the caller and recipient of an intended phone call over an Internet connection, the IDD or long distance call is disconnected in step 302. Both caller and recipient parties each activate the Internet Call/Auto Answer button and their respective Internet phones 103 automatically undertake to make an Internet connection, i.e. make a connection with their respective Internet Service Providers in step 303. Once connected to their ISPs, the caller and recipient Internet phones 103 each automatically connect to a Directory Service such as a Lightweight Directory Access Protocol (LDAP) in step 304. The LDAP is an open standard protocol for directory services on the Internet 104. The LDAP provides a standard way for Internet clients or applications and servers to access directory services and locate organizations, organizational units or individuals. Once connected to the Directory Service such as the LDAP, each of the caller and recipient Internet phones 103 automatically submit their IP address and telephone number, and the caller Internet phone 103 also submits the recipient Internet phone's telephone number in step 305. The LDAP matches the recipient's telephone number submitted by the caller with the recipient's telephone number submitted by the recipient. Instead of matching telephone numbers, the LDAP could match other unique identifiers submitted by the recipient and the caller and the unique identifiers do not have to be identical as different unique identifiers could be linked and matched by a table look up in a data base. This matching procedure by the LDAP is referred to as an LCD connection. Once the LCD connection is indicated as done in step 307, there will be a ring back tone to the Internet phones 103 of the caller and recipient parties 308 to indicate that the LCD connection is completed in step 308. The virtual circuit Internet connection between the Internet phones is then completed in step 309 by the LDAP providing the caller's IP address to the recipient and vice versa. If the LCD connection is not completed in a pre-programmed time interval in step 306, i.e., no ring back tone is received 308 by both the caller and recipient Internet phones 103 in W seconds, the caller and recipient Internet phones 103 disconnect from their respective ISP in step 310. Once established, the phone call over the Internet connection can be readily disconnected by de-activating the Internet Call/Auto-Answer button.

In mode 3, both Internet phones 103 are automatically connected over an Internet 104 in response to the call made by use of one of the Internet phones 103. The automatic Internet phone call setup and tear down procedure is detailed by flow chart 400 of FIG. 4. Initially, the calling party manually dials the IDD or long distance phone number in step 401 of the recipient party's Internet phone 103. With a reception of the manually dialed IDD or long distance telephone number, the caller's Internet phone 103 searches its phone book directory for a match with the manually dialed telephone number in step 402. When no match is made with the phone book directory listings, the caller's Internet phone 103 initiates an automatic dialing routine to notify the recipient party of an intended phone call over an Internet connection by means of a detectable ringing characteristic. The dialing routine for a non-match with the phone book directory listing is a differential automatic dial sequence as follows: First the caller's Internet phone 103 automatically calls the manually dialed IDD or long distance telephone number of the recipient party and provides a detectable ringing characteristic, while the recipient's Internet phone 103 correspondingly undertakes detection of the detectable ringing characteristic. The detectable ringing characteristic may be a predetermined varying time interval measured from the time of the first ring to the time that caller's Internet phone disconnects, or it may be a predetermined number of rings in a ringing interval followed by the caller's Internet phone disconnecting. The calling party's Internet phone 103 may monitor the recipient's Internet phone 103 status through the tone detector as a dynamic way to determine the ringing duration, as an alternative to a fixed pre-defined ringing interval value. The prior steps of calling for the predetermined time interval or predetermined number of rings and then disconnecting are repeated an N number of times in steps 416, 417 to complete the differential automatic dial sequence. As a result of the automatic differentia dial sequence, the detectable ringing characteristic will be applied to the recipient's Internet telephone N times to thus apply to the recipient's Internet phone a unique ringing sequence. The unique ringing sequence, in addition to including durations in the number of rings in a ringing interval may also include the duration of the intervals between varying intervals, that is the intervals between successive calls. The recipient's Internet phone does not answer the telephone call (go off-hook) in response to the ringing during the ringing sequence, but merely monitors the ringing sequence to detect that the unique ringing sequence has been received.

Tables 1 and 2 below show a few possible configurations of a differential automatic dialing and detection sequence as the unique ringing sequence.

TABLE 1

Caller Party

| | | | | |
|---|---|---|---|---|
| Detect 1st Ringing Interval | 2 | 3 | 4 | 5 |
| Disconnect Call Interval {Second} | 1–10 | 1–10 | 1–10 | 1–10 |
| Detect 2nd Call Ringing Interval | 2 | 3 | 4 | 5 |
| Disconnect Call Interval {Second} XXXXXXX | 1–10 | 1–10 | 1–10 | 1–10 |
| Differential Ringing | 0 | 0 | 0 | 0 |

Caller Party Automatic Dialing and Detection Sequence

TABLE 2

Recipient Party Detections Sequence

Recipient Party

| | | | | | | | | | | | | |
|---|---|---|---|---|---|---|---|---|---|---|---|---|
| Detect 1st Call Ringing Interval Disconnect Call Interval {Second} | 2 | 2 | 2 | 3 | 3 | 3 | 4 | 4 | 4 | 5 | 5 | 5 |
| Detect 2nd Call Ringing Interval Disconnect Call Interval {Second} XXXXXXX | 1 | 2 | 3 | 2 | 3 | 2 | 3 | 4 | 5 | 4 | 5 | 6 |
| Differential Ringing | 1 | 0 | 1 | 1 | 0 | 1 | 1 | 0 | 1 | 1 | 0 | 1 |

After the caller's Internet phone 103 has executed the automatic dialing routine, (i.e., differential automatic dialing sequence), if the caller's Internet phone 103 is determined to be in the pass through mode in step 418, the caller's Internet phone 103 in step 415 will automatically undertake to make an Internet connection. Otherwise, the Internet phone 103 will be in a busy tone detection mode and from step 418 will enter step 419 and will continue the automatic dialing routine until a busy tone is detected and then automatically undertake to make an Internet connection. The presence of the busy tone is used as an indication that recipient's Internet telephone has detected the unique ringing sequence and has begun to respond. It should be noted that detection of the busy tone needs to be done in a pre-programed time interval, for example, 15 to 60 seconds.

After the recipient's Internet phone 103 has detected the unique ringing sequence, the recipient's Internet phone 103 will then automatically undertake to make an Internet connection. It should be noted that the detection of the unique ringing sequence by the recipient side Internet phone 103 needs to be done in a pre-programmed time interval, for example, 15 to 120 seconds.

Figure 4:
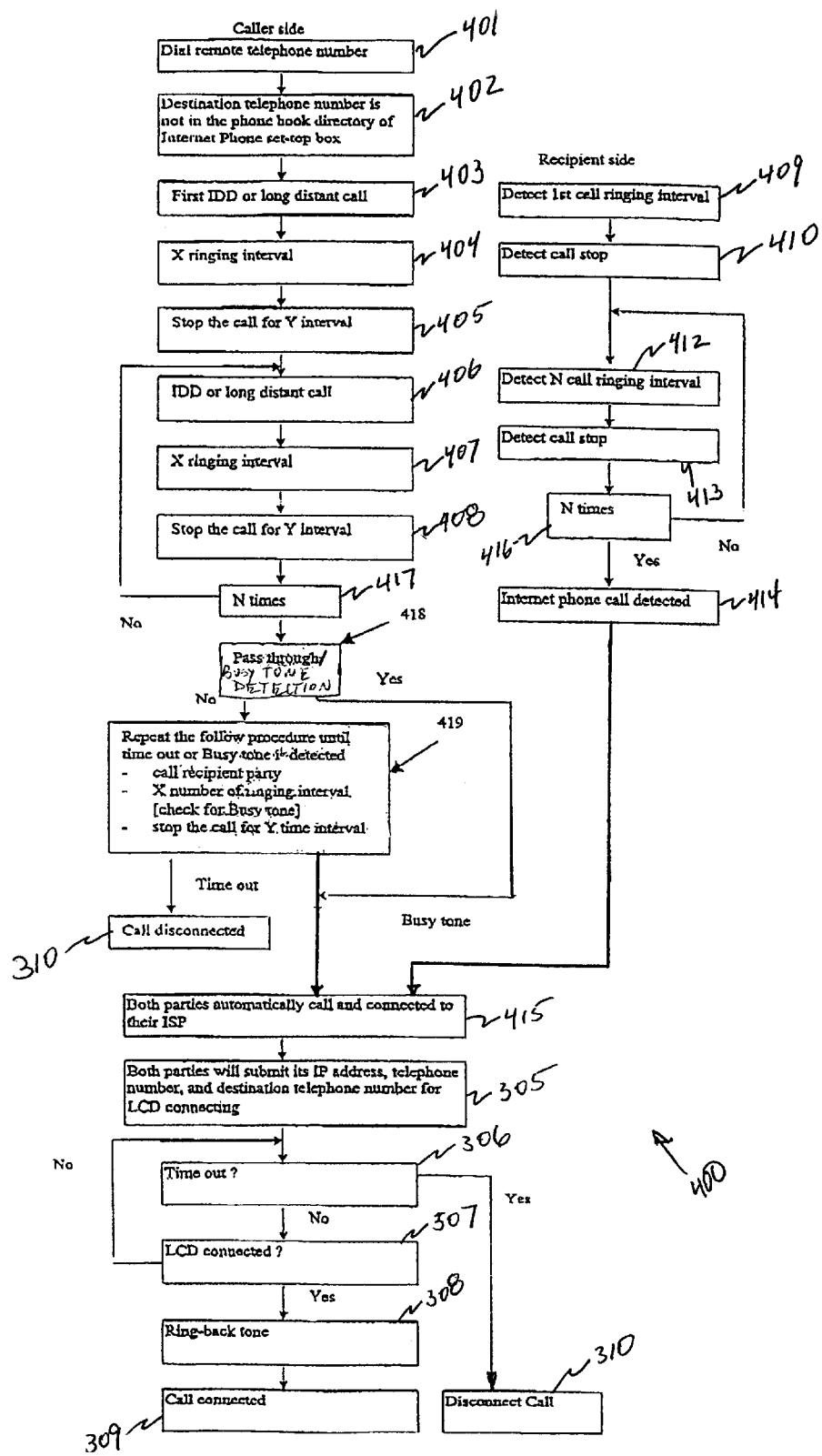
FIG. 4 is a flow chart of an automatic Internet phone call setup by a differential automatic dial sequence in accordance with the present invention.

Referring to FIG. 4, the caller party manually dials the recipient's telephone number in step 401. The caller's Internet phone 103 detects the manually dialed telephone number and checks it against an internally stored phone book directory listing in step 402. If there is no match with the phone book directory listing, the caller's Internet phone 103 automatically initiates, in response to the manual dialing by the caller, an automatic dialing routine that begins with an IDD or long distance call 403 to the recipient's Internet phone 103 with a predetermined X ringing interval in step 404. The recipient's Internet phone 103 correspondingly undertakes detection of the predetermined ringing interval in step 409. The caller's Internet phone 103 stops the call 403 (disconnects) for a predetermined Y interval in step 405, while the recipient's Internet phone 103 detects the stop of the call in step 410. The caller's Internet phone 103 then repeats making the IDD or long distance call an N number of times with a predetermined X ringing interval in steps 406 and 407 during each N number call, while the recipient's Internet phone 103 undertakes detection of the predetermined ringing interval 412 during each N number call. Then, if the caller's Internet phone 103 is in the pass through mode when step 418 is reached, it will stop placing the IDD or long distance calls and automatically call and undertake to make an Internet connection. Otherwise, if the Internet phone 103 is in the busy tone detection mode, it will repeat IDD or long distance call with an X ringing interval and Y seconds of a call to call interval in step 419 until a busy tone is detected or until a time out occurs. The recipient's Internet phone 103, after each successful detection of the predetermine ringing interval in step 412, detects the call stop in step 413. The recipient's internal phone 103 in step 416 determines whether the program has cycled through steps 412 and 413 N times corresponding N successful detection of the predetermined ringing interval and N successful detections of the call stop. If so, the recipient's internal phone 103 in step 414 detects that a phone call over an Internet connection is desired by the caller and automatically calls and undertakes to make an Internet connection in step 415. If the caller's Internet phone 103 is in the Busy Tone Detection mode in step 418 (not in the pass through mode), it will automatically call and undertake to make an Internet connection in step 415 after detection of the busy tone in step 419. Both Internet phones 103 will be connected to their respective ISPS 415. Once connected to their respective ISPS, the caller and recipient Internet phones 103 automatically connect to the Directory Service such as the LDAP, the caller and recipient Internet phones 103 each submit their respective IP address and telephone number, and the caller additionally submits the recipient's telephone number in step 305. When the LCD Internet connection is completed in step 307, there will be a ring back tone to both parties in step 308 to indicate that the LCD connection is established and in step 309, the Internet connection is completed by the Internet phones each receiving the other's IP address from the LDAP. If the Internet LCD connection is not done in a pre-programmed time interval (step 306), i.e., no ring back tone is received in step 308 by both the caller and recipient Internet phones 103 in W seconds, each of the caller and recipient Internet phones 103 disconnect from their respective ISP in step 310. Once established, the phone call over the Internet connection can be readily disconnected by de-activating the Internet Call/Auto-Answer button. In this manner, an Internet telephone connection is made automatically between the caller's Internet phone and recipient's Internet phone in response to a call made by the caller's internal phone without intervention by the user of the recipient's Internet phone.

Figure 5:
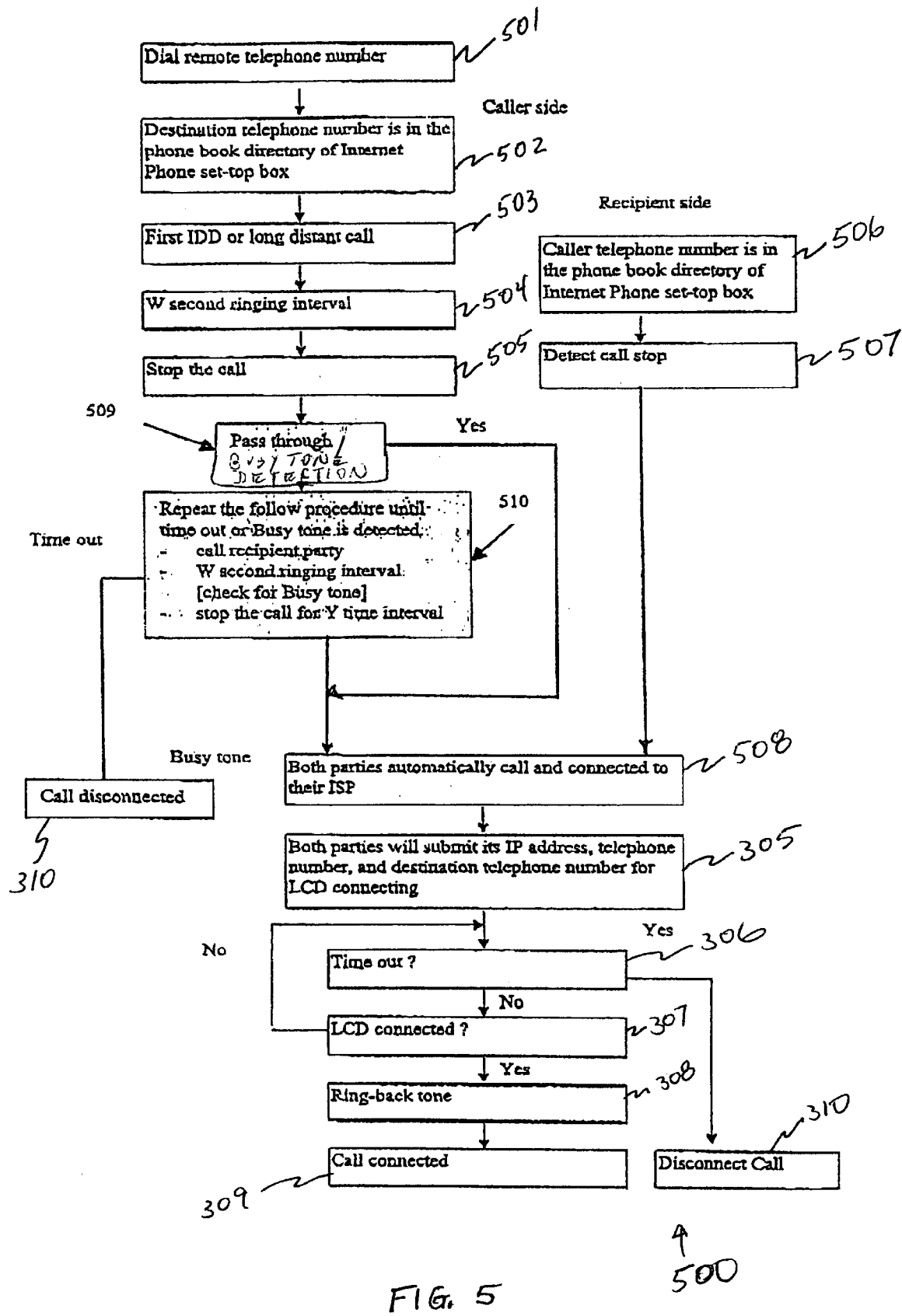
FIG. 5 is a flow chart of an automatic Internet phone call setup by a phone book directory in accordance with the present invention.

In mode 4, both parties are automatically connected to the Internet 104. In this mode, the unique ringing sequence consists of a single call presenting the detectable ringing characteristic. The automatic Internet phone call setup and tear down procedure is detailed by flow chart 500 of FIG. 5. Initially, the calling party manually dials the IDD or long distance telephone number in step 501. With reception of the IDD or long distance telephone number, the phone 103 undertakes a match of the IDD or long distance number with a phone book directory in step 502.

With a match to a listing in the phone book directory, the caller's Internet phone 103 initiates an automatic dialing routine that includes one IDD or long distance call in step 503 to the recipient's Internet phone 103 with a W second ringing interval in step 504, e.g., 1–60 seconds, and then the caller's Internet phone 103 stops the call in step 505. Correspondingly, the recipient's Internet phone 103, has the caller's telephone number in its phone book directory and, undertakes a detection of the ringing interval in step 506 and then detects the call stop in step 507. If the caller's Internet phone 103 is in the pass through mode in step 509, it will automatically call and undertake to make an Internet connection in step 508. Otherwise, in the busy tone detection mode, the caller's Internet phone 103 will repeat the IDD or long distance call with an X ringing interval and Y seconds of a call to call interval in step 510 until a busy tone is detected. The caller's Internet phone 103 then will automatically call and undertake to make an Internet connection in step 508 after detection of a busy tone in step 510. As for the recipient's Internet phone 103, it will automatically undertake to make an Internet connection after detecting a call stop in step 507. Both Internet phones 103 will be connected to their respective ISPS in step 508 and then connect to the Directory Service such as the LDAP. Once connected to the LDAP, each of the caller and recipient Internet phones 103 submit their respective IP address and telephone number. The caller Internet phone also submits the recipient's telephone number. When an LCD connection has been made as determined in step 307, there will be a ring back tone to both parties in step 308 and to establish the Internet call in step 309. If the LCD connection is not done in a pre-programmed time interval as determined in step 306, each of the caller and recipient Internet phones 103 disconnect from their respective ISP in step 310. Once established, the phone call over the Internet connection can be readily disconnected by de-activating the Internet Call/Auto-Answer button.

As an alternative to the ringing interval detection scheme for an incoming call represented in Table 2, the detection means employed can be based on differential timing between the time interval of ringing of each call. With this embodiment, an incoming call is detected by measuring the ringing duration (start of ring to end of a ringing interval) per call and detecting the sequence by the differential timing between time interval of ringing of each call as exemplified in Table 3.

It should be noted that in practical terms, the measured timing is rounded to the nearest integral of a second, and the time interval of ringing of each call is defined as the timing measured between the start of the first ring tone to a call hang up. In the Windows 95/98 TAPI environment, it can be measured by the timing between call-offering to call-idle of each call.

TABLE 3

Recipient Party Detection Sequence

| Recipient Party | | | | | | | | | | | | |
|---|---|---|---|---|---|---|---|---|---|---|---|---|
| Detect 1st Call Ringing Interval [second] | 4 | 4 | 4 | 6 | 6 | 6 | 6 | 6 | 8 | 8 | 8 | 8 |
| Disconnect Call Interval [Second] | | | | | | | | | | | | |
| Detect 2nd Call Ringing Interval [second] | 2 | 4 | 6 | 2 | 3 | 6 | 1 | 2 | 1 | 6 | 10 | 13 |
| Disconnect Call Interval {Second} XXXXXXX | | | | | | | | | | | | |
| Differential Timing [second) | 1 | 0 | 1 | 1 | 0 | 1 | 1 | 0 | 1 | 1 | 0 | 1 |

Alternatively, if the ringing characteristic to be detected is the number of rings per call, the unique ringing sequence to be detected may be a difference in the number of rings in successive calls.

It can be appreciated that the above hardware and software configuration can be practiced to provide tele-conference capabilities between multiple phone parties. The tele-conference can be with all parties interconnected through an Internet connection and an Internet phone and the above software and hardware configurations modified to provide for full duplex communications between all the parties. Alternatively, two parties can be connected over the Internet as described above, and multiple parties can be brought into the phone call connection through connections over the PSTN into the phones 101. In this case the relay would be in an additional mode whereby the phone 101 is in both a PSTN mode and an Internet mode.

The above two techniques of automatic dialing to establish a phone call over the Internet 104, by the Internet phone set-top box 103, or a PC configured with the capabilities of the Internet phone 103, can be affected by the timing required to establish the connection. In other words, the connection time could be just a few seconds for a local recipient connected indirectly to a local network interconnection between the calling and recipient parties, while the connection time could be tens of seconds for an overseas recipient connected indirectly through an international network interconnection between the calling and recipient parties. Consequently, the ringing interval parameters in the automatic dialing and detection must be fine tuned to compensate for timing delays due to interconnection variations on the network.

The timing delays in the differential dialing sequence between peer-to-peer communication, i.e. calling party-to-recipient party via their respective Internet phones 103, can be avoided if the differential dialing sequence is moved from the Internet phone 103 to a so called knocking server on the Internet. With such a knocking server a shorter duration in the ringing interval is possible, which permits establishment of a more reliable call connection. In addition, the knocking server, by initiating the differential dialing sequence with a recipient party's Internet phone 103, can enable a PC station with Internet connection capabilities to prompt the knocking server to execute an automatic dialing sequence from the Internet, in order to establish a phone call over the Internet with a recipient party's Internet phone 103 or computer station.

Figure 6:
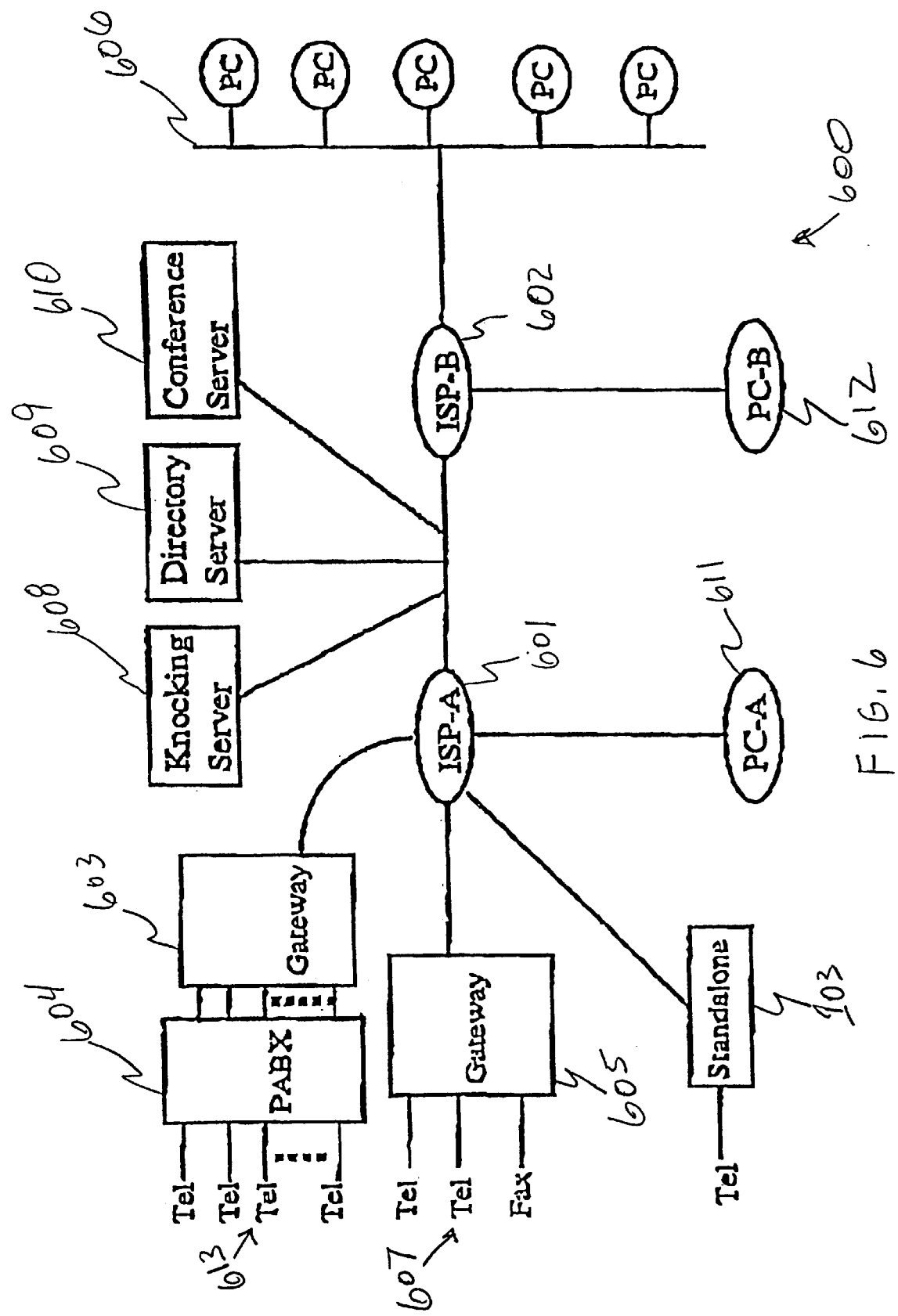
FIG. 6 is a block diagram of an Internet telephone network configuration employing knock servers to recite automatic dialing to establish a phone call over the Internet.

Referring now to FIG. 6 there is shown a block diagram 600 of an Internet telephony network configuration employing a knocking server 608 for executing automatic dialing to a recipient over the Internet. A first Internet service provider (ISP) 601 is connected to a first gateway 603 tied to a private automatic branch exchange (PABX) 604 serving multiple telephones 613, a second gateway 605 servicing end use equipment 607 such as telephones and a facsimile, a stand-alone Internet phone 103 connected to a telephone (or a stand-alone telephone connected to equipment configured with capabilities of the Internet phone 103 such as differential dialing detection and Internet communication capabilities), and a personal computer station 611. Connected to a second Internet service provider (ISP) 602 are a local area network (LAN) 606 of computer stations, and a single personal computer station 612. The Internet service providers 601 and 602 are connected to each other, and to a knocking server 608, a directory server 609, and a conference server 610.

The diagram 600 of FIG. 6 is intended only as an example of the possible end user equipment interconnections to the Internet with ISPS 601 and 602, knocking server 608, directory server 609 and conference server 610, that will support phone, facsimile, voice mail, video mail, and other services. Consequently, at a minimum, the knocking server 608 need only be utilized in conjunction with the Internet phone 103 of a recipient party or other end user equipment connected to the Internet, such as the single computer station 611, that is capable of detecting the unique ringing sequence presented by the knocking server 608.

Gateways, such as 603 and 605, are devices used to connect dissimilar networks using different communication protocols, so that information can be passed from one network to the other. The gateway both transfers information and converts it to a form compatible with the protocols used by the second network for transport and delivery. The second gateway 605 of FIG. 6 transfers and converts the signals from the end user equipment 607 into an Internet, compatible format.

The first gateway 603 of FIG. 6 transfers and converts signals from the PABX 604 into an Internet compatible format. The PABX 604 is a private telecommunications exchange that includes access to a public telecommunications exchange, e.g. telephone switching system.

The conference server 610, shown interconnected between the ISPs 601 and 602, is configured to simultaneously transmit and receive multiple voice based data packets on the Internet, in order to support multi-party phone calls over the Internet.

The directory server 609, shown interconnected between the ISPs 601 and 602, is configured for directory services such as the lightweight Directory Access Protocol (LDAP) detailed above.

The personal computers (PC) PC 611, connected to the first ISP 601, and PC 612, connected to the second ISP 602, each can have modem function capabilities or a leased line access for linking with the respective ISP's 601 and 602. The LAN 606 of personal computers can be connected to its ISP 602 by a dedicated leased line. A wide area network (WAN) of personal computers can be interconnected to the Internet and employ the knocking server 608 to initiate a unique ringing sequence. Personal computers, can be used as a source or destination of video, graphics, audio and user data.

The knocking server 608 is configured to provide automatic differential dialing for a caller party, not having an Internet phone 103, to preferably a recipient party with the Internet phone 103 detailed above. The knocking server 608 can also be employed to establish a phone call connection over the Internet with a recipient's personal computer configured to detect the unique ringing sequence generated by the automatic differential dialing sequence by the knocking server 608.

Figure 7:
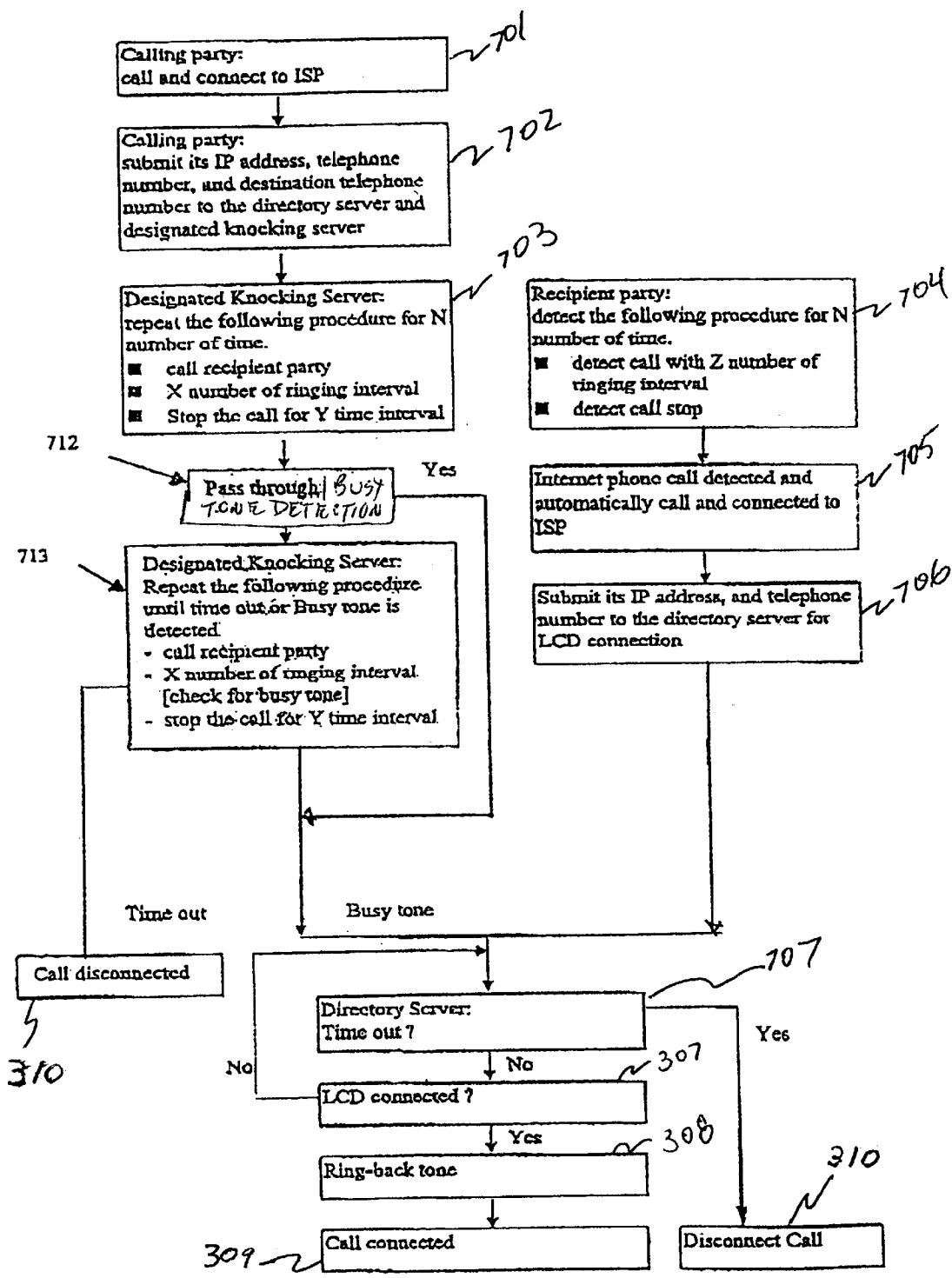
FIG. 7 is a flow chart of an Internet phone call setup by a Knocking server with differential automatic dial sequence in accordance with the present invention.

Referring now to the flow chart 700 of FIG. 7, the steps for an Internet phone call setup with the knocking server 608 are detailed. Initially, the calling party dials out to make a connection with its ISP in step 701. Once connected to the ISP the calling party submits its IP address and telephone number, and the recipient's telephone number, to both the directory server and a designated knocking server in step 702. The designated knocking server will then initiate an automatic dialing sequence in step 703 through a local or long distance telephone call to the recipient party. The proposed automatic dialing sequence generates a unique ringing consisting of the knocking server repeating for an N number of times an X number of ringing intervals followed by no rings for a Y time interval. Correspondingly, the recipient party's Internet phone 103 (or similarly configured PC or end equipment setup) in step 704 undertakes detection of the ringing interval, repeated for an N number of times, followed by a detection of the call stop when the call is disconnected. This detection of the unique ringing sequence by the recipient party needs to be done in a pre-programmed time interval, for example 3 to 30 seconds. Possible configurations of the differential automatic dialing and detection sequence are shown below in Tables 4 and 5:

TABLE 4

Knocking Server

| Detect 1st call ringing interval | 2 | 3 | 4 | 5 |
|---|---|---|---|---|
| Disconnect call interval [second] | 1–10 | 1–10 | 1–10 | 1–10 |
| Detect 2nd call ringing interval | 2 | 3 | 4 | 5 |
| Disconnect call interval [second] | 1–10 | 1–10 | 1–10 | 1–10 |
| ... | | | | |
| Differential ringing | 0 | 0 | 0 | 0 |

Knocking server automatic call dialing and detection sequence

TABLE 5

Recipient party detection sequence

Recipient Party

| Detect 1st call ringing interval | 2 | 2 | 2 | 3 | 3 | 3 | 4 | 4 | 4 | 5 |
|---|---|---|---|---|---|---|---|---|---|---|
| Disconnect call interval [second] | — | — | — | — | — | — | — | — | — | — |
| Detect 2nd call ringing interval | 1 | 2 | 3 | 2 | 3 | 2 | 3 | 4 | 5 | 4 |
| Disconnect call interval [second] | — | — | — | — | — | — | — | — | — | — |
| ... | | | | | | | | | | |
| Differential ringing | 1 | 0 | −1 | 1 | 0 | −1 | 1 | 0 | −1 | 1 |

After the detection of the ringing sequence, the recipient party's Internet phone 103 will then automatically call and be connected to its ISP in step 705. If the designated knocking server is not in the pass through mode (step 712), it will initiate another ringing sequence in step 713 to the recipient's Internet phone 103 until a busy tone is detected or a time out duration is reached. The recipient submits its IP address and its telephone number to the directory server such as the LDAP in step 706. Once an LCD connection is done, i.e. a matching of the telephone numbers by the Directory server within a pre-programmed time interval (step 707), a ring back tone is provided to both parties in step 308 and the Internet call is established in step 309.

If the LCD connection is not made, i.e. there is no matching of the recipient's telephone number in a pre-programmed time interval, then both the calling and recipient parties are disconnected from their respective ISPS. The Internet call can be easily disconnected by de-activating the Internet Call/Auto Answer button.

Alternatively, the knocking server 608 can be configured so that if during the local phone call to the recipient, before initiating the differential dialing sequence, a busy tone is detected indicating that the recipient may already be on an Internet connection, the knocking server can search the directory server for the telephone number and IP address of the recipient and attempt an Internet phone call connection over the Internet without ringing the recipient's Internet phone.

The knocking server 608, as detailed by the discussion of the flow chart 700, allows for an automatic dialing and call establishment technique over the Internet that is an alternative to peer-to-peer automatic dialing. The designated knocking server can be a local knocking server, located nearest to the recipient party, that will reduce connection time required as compared to the differential dialing sequence between an Internet phone 103 to an Internet phone 103. Alternatively, the designated knocking server can be a remote knocking server, located nearest to the calling party that can serve other PCS connected to an LAN or WAN that is leased-line connected to an ISP.

The source and destination telephone number matching provided by the directory server is a simpler and more reliable matching technique for establishing a call connection. The telephone numbers of the calling and recipient parties are unique identifiers on the directory server.

The use of the knocking server 608 permits the calling party's equipment to be any type capable of communicating over the Internet, including a gateway, stand alone Internet phone, a PC connected to an LAN or WAN, PC connected to the Internet via a modem, and an electronic mail server for automatic mail notification. Likewise, similar type of equipment can be used by the recipient party if it is configured for the detection of the differential dialing sequence over the local telephone call.

The knocking server 608 can be configured with a look-up table containing various parameters such as the X ringing interval, Y interval, and the N number of repetitions. The look-up table can enable fine tuning of the differential dialing to adapt to different call dialing delays caused by the interconnection of different PSTN switches. The look-up table can have values for the X, Y and N parameters based on telephone calls between various cities or area codes. In this way, a simpler matching technique is provided, which establishes an automatic call connection by matching source and destination locations on the Internet and allows for fine tuning the connection timing.

With reference to FIG. 6, the devices labeled 604, 613, 607, 103, 611, 612 and 606 are not pre-assigned with an Internet IP address before an Internet connection. The devices 604, 607, 103, 611 and 612 are associated with telephone numbers, the devices 613 are associated with telephone numbers with extensions, and devices 606 are associated LAN IP addresses. They are assigned with Internet IP addresses after the Internet connection. With this association of Internet IP addresses, the devices can then be manually setup and then find out their respective Internet IP address and be connected for Internet communication with each other. Therefore, there is no existing direct or automatic protocol that is being defined to allow these devices to attain an Internet connection and facilitate communication between the caller and recipient.

For a standalone Internet phone device 103, as discussed herein, the caller device 103 will submit its telephone number, its assigned Internet IP address and the recipient's telephone number to the LDAP for an LCD connection. Likewise, the recipient's device 103 will submit its telephone number and its assigned IP address to the LDAP for an LCD connection.

For PC-based Internet phone devices 611, 612 with dial-up modem connections, as discussed herein, the caller devices 611, 612 will submit its associated telephone number, its assigned Internet IP address and recipient's telephone number to the LDAP for an LCD connection. Likewise, the recipient's devices 611, 612 will submit its associated telephone number and its assigned Internet IP address to the LDAP for an LCD connection.

For telephone device 607 with a gateway 605 configuration, there exists an IP switch in the gateway 605 which can dynamically map the caller device's 607 associated telephone number to one of the fixed Internet IP addresses allocated to the gateway 605. The gateway 605 is then required to submit the caller device telephone number, its assigned Internet IP address and the recipient's telephone number to the LDAP for an LCD connection. Likewise, the recipient device associated telephone number will be used by the IP switcher of the second gateway 605 for dynamically mapping the Internet IP address. The recipient device associated telephone number with the assigned Internet IP address will then be submitted by the second gateway 605 to the LDAP for an LCD connection. With this dynamic mapping of a finite fixed Internet IP address to infinite telephone numbers, an infinite number of Internet IP addresses is virtually assigned to the gateway 605 that can support an infinite number of terminal devices (telephone sets) connected to the Internet.

For telephone devices 613 with PABX 604 and gateway 603 configuration, there exists an IP switch in the gateway that can dynamically map the caller device's 613 associated telephone number with extension to one of the fixed Internet IP addresses allocated to the gateway 603. The gateway 603 is then required to submit the caller device 's telephone number with extension, its assigned IP address and the recipient's telephone number to the LDAP for an LCD connection. Likewise, the recipient device's associated telephone number with extension will be used by the IP switch of the second gateway 603 for dynamically mapping an Internet IP address. The recipient device's associated telephone number with extension and the assigned Internet IP address will then be submitted by the second gateway 603 to the LDAP for an LCD connection. With this dynamic mapping of finite fixed Internet IP address to a finite telephone number with infinite extensions, an infinite number of Internet IP addresses is virtually assigned to the gateway 603 that can support infinite numbers of terminal devices (telephone sets) connected to the Internet.

For devices 606 on an LAN connection to the Internet through leased line, there exists an IP switch in the routing server which can dynamically map the caller device's 606 associated telephone number and its LAN IP address to one of the fixed Internet IP addresses to the LDAP for an LCD connection. Likewise, the recipient device's 606 associated telephone number and its LAN IP address will be used by the IP switch of the second routing server for dynamically mapping the Internet IP address. The recipient device's associated telephone number with its LAN IP address and the assigned Internet IP address will then be submitted by the second routing server to the LDAP for an LCD connection. With this dynamic mapping of a finite fixed Internet IP address to infinite telephone numbers and LAN IP addresses, an infinite number of Internet IP addresses is virtually assigned to the lease line that can support an infinite number of terminal devices [PCS] connected to the Internet.

For devices 608, 609 and 610, a fixed Internet address will be assigned after power up and connection to the Internet.

Figure 8:
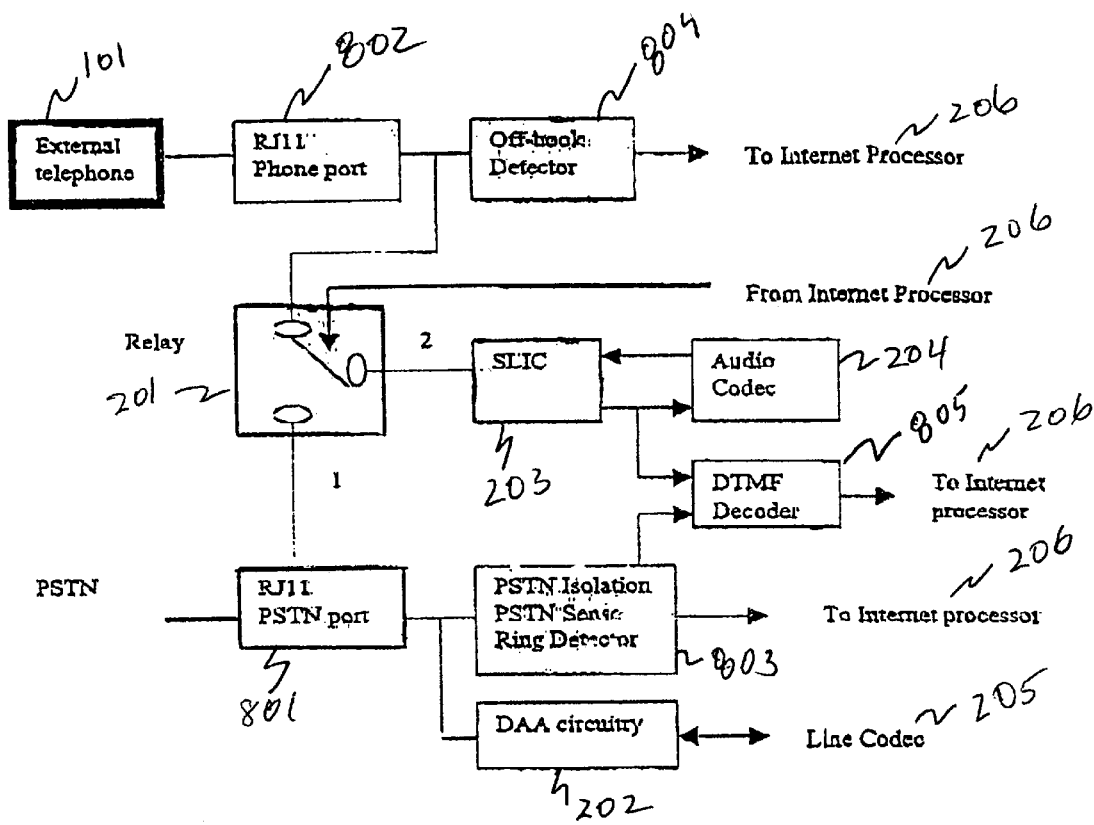
FIG. 8 is a detailed block diagram of the Internet phone set-top box device for an external telephone and PSTN.

Referring now to FIG. 8, there is shown a block diagram 800 of details of the Internet phone set-top box for an external phone set and PSTN application. If no power is applied to the Internet phone set-top device 103, the relay 201 is at position 1 and connected to the PSTN via an RJ11 connection port 801, i.e., the relay is at a no power default position. In this situation the telephone 101 is connected to the PSTN and is always available to make or receive an analog call.

When power is applied to the Internet phone set-top device, the relay 201 is switched to position 2 and connected to the SLIC 203, i.e., the relay is in a power on default position. With the relay in this position, the four main modes of operation are: incoming analog phone call, incoming Internet phone call, outgoing analog phone call, and outgoing Internet phone call.

When the relay 201 is at position 2 and connected to the SLIC 203, all incoming phone calls from PSTN are disconnected from the telephone set. The Internet processor 206 will detect whether the incoming call is a PSTN analog or Internet phone call. It detects the ringing signal through the ring detector 803. If the number of rings is more than a predefined threshold value, this occurrence is detected as indicating an incoming analog call and the relay 201 will switch to position 1 so that the telephone is connected to the PSTN through the relay 201. The telephone, connected to the relay 201 through the phone port 802, will start ringing upon receiving the ringing tone from the PSTN. The recipient is then free to pick up the headset to converse with the calling party. Thereafter, upon detecting that the phone has been hung up, i.e., on hook, by the off detector 804 or remote call disconnect, the relay will be switched back by the Internet processor 206 to position 2.

With the relay at position 2 and connected to the SLIC 203, all incoming calls from PSTN are disconnected from the telephone set. The Internet processor will detect whether the incoming call is a PSTN analog or an Internet phone call. It detects the ringing signal through the Ring detector 803. If the unique ringing sequence is detected, the Internet phone will automatically undertake to make an Internet connection. The Internet processor 206 will execute the modem algorithms and make a connection to the respective ISP. After an LCD connection is established as explained above, the recipient's Internet processor 206 will ring the recipient's telephone, if the telephone is on-hook, through the SLIC 203. This ringing tone is different in cadence and/or frequency from the normal ringing tone generated by the cental office to indicate that the call is an incoming Internet call. The recipient is then free to pick-up the headset for a conversation in an Internet call. Thereafter, upon detecting a phone hang-up, i.e., on-hook, by the off-hook detector 804 or remote call disconnect, the Internet processor will disconnect the modem link and maintain the relay at the current position 2 connected to the SLIC 203. The presence of relay 201 and the associated circuits will allow the differential ringing at the recipient party communication equipment from being applied to the telephone 101 so no ring tone at the external phone occurs during the Internet call ringing sequence and detection process.

For an outgoing analog phone call the relay 201 at position 2 and connected to the SLIC, the operation is as follows. Upon detecting a phone off-hook by the off-hook detector 804, the relay will switch to position 1 by the Internet processor 206 and the telephone will be connected to the PSTN. At this state all dialed DTMF digits by the caller will be passed through to the PSTN central office while simultaneously being monitored by the Internet phone's DTMF decoder 805. In the case of a PSTN analog call no further action is taken by the Internet phone set-top device 103. Upon detecting a phone hang-up, i.e., on-hook, by the off-hook detector 804 or remote call disconnect, the relay 201 will switch back to position 2 by the Internet processor 206 and the telephone 101 is connected to the SLIC.

For an outgoing Internet phone call, the relay 201 is at position 2 and connected to the SLIC. Upon detecting a phone off-hook condition by the off-hook detector 804, the relay will switch to position 1 and the telephone will be connected to the PSTN. At this state all dialed DTMF digits by the caller are passed through to the PSTN central office while simultaneously being monitored by the Internet phone's DTMF decode 805. In the case of an Internet phone call, a specific DTMF digit, or a sequence of DTMF digits, is used as a prefix and suffix to the phone number, which specific digit or digits will cause the Internet processor to switch the relay to position 2 and the telephone 101 is connected to the SLIC 203. The Internet processor will then initiate the automatic differential dialing sequence through the DAA/Line Codec. Then, the Internet processor will automatically undertake to make an Internet connection and be connected to its ISP.

During progress of an Internet call, the caller can activate the "connect and ring back" feature by dialing a specific DTMF digit and then hang-up (on-hook) the phone. It should be noted that the next phone off-hook condition will clear the "connect and ring back" setting. After an LCD connection is established, the caller is then free to communicate with the remote party if the "connect and ring back" feature is not activated. If the connect and ring back feature is activated, the Internet processor will ring the caller's telephone through the SLIC after an LCD connection is established and the caller is then free to pick up the headset for a conversation. This ringing tone is different in cadence and/or frequency from the normal ring-back tone generated by the central office to indicate that the call is an Internet call.

Upon detecting a phone-up (on-hook) by the off-hook detector 804 or remote call disconnect, the Internet processor will disconnect the modem link and the relay is maintained at the current position 2 and connected to the SLIC.

The ring detector 803 is combined with a PSTN isolation and sensing circuit in the Internet phone set-top box or other devices. The PSTN isolation and sensing circuit is used to monitor the audio signal on the PSTN for further processing like DTMF tone decoding, speech recognition, etc. The PSTN isolation and sensing circuit is also used to automatically sense the presence of a PSTN line connection for further processing.

With reference to the SLIC 203 and the off-hook detector 804 of FIG. 8, an alternative method to automatically detect the presence of a PSTN line connection is provided. This alternative method entails using a combination of an on-chip off-hook detector in the SLIC 203 and off-hook detector 804. Detection of the presence of the PSTN line connection begins with the telephone on-hook and the Relay 201 at position 2. That is, the telephone 101 is connected to the on-board SLIC 203. Upon the telephone being placed in an off-hook state, the on-chip off-hook detector of SLIC 203 will send the off-hook signal to the Internet processor 206. The Internet processor 206 is then required to switch the Relay 201 to position 1 in order for the user to make a phone call. If the PSTN line is connected, the Central Office will feed power to the telephone 101, whereupon the off-hook detector 804 will send the off-hook status to the Internet processor 206. Upon receiving the dial tone from the Central Office, the user can then make a phone call. However, if the PSTN line is not connected, the telephone will receive no power from the Central Office. As a result, the off-hook detector 804 will send an on-hook status to the Internet processor 206. The Internet processor 206 will then switch the Relay 201 to position 2. The on-chip detector of the SLIC 203 will then detect the off-hook status again and send the status to the Internet processor 206.

This off-hook detection followed by an on-hook detection and followed again by an off-hook detection in a pre-defined time interval indicates the PSTN line is not connected. In this manner, the presence or absence of the PSTN line connection can be detected.

Figure 9:
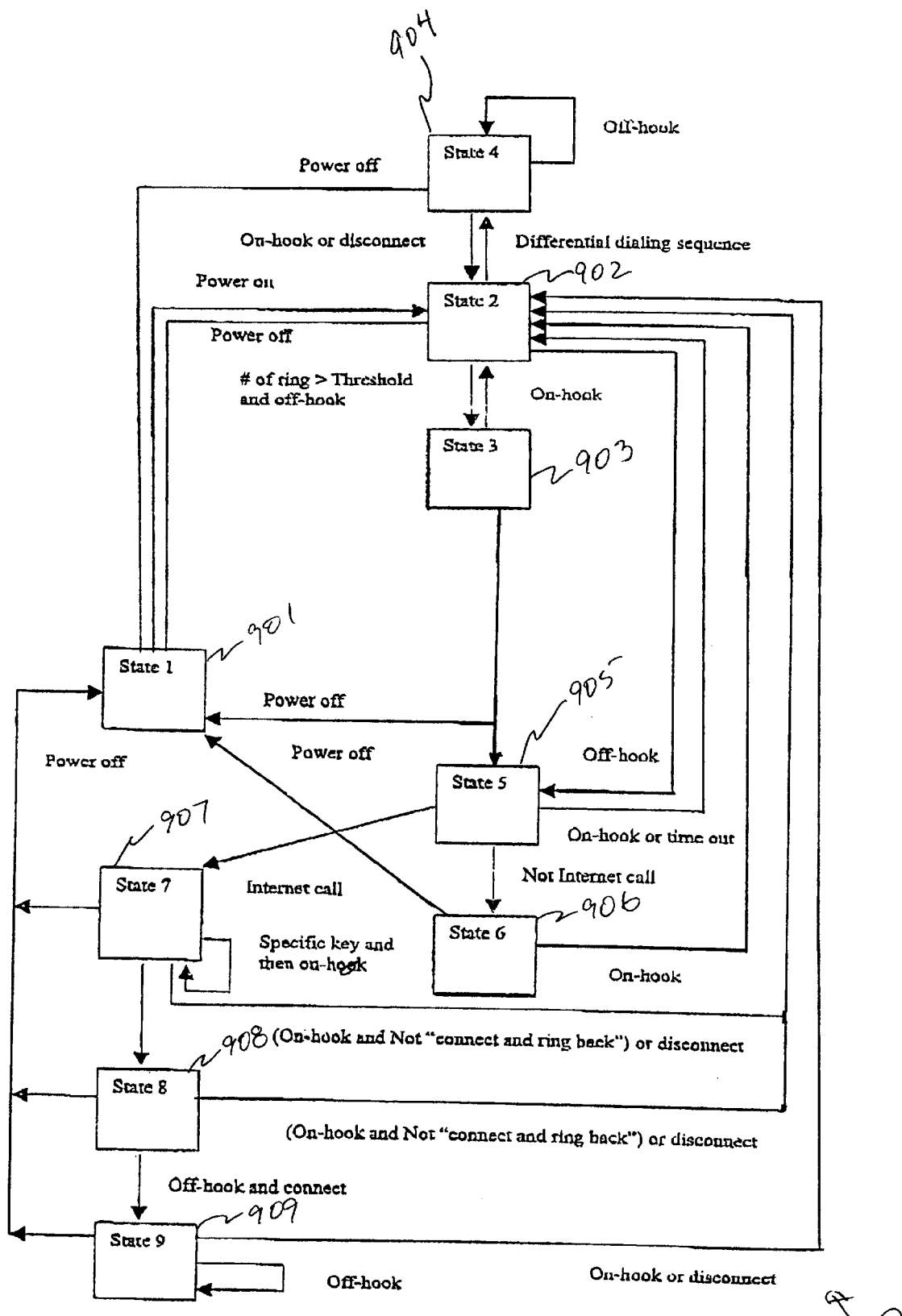
FIG. 9 is a state diagram of the relay control for the Internet phone in accordance with the present invention.

Referring now to FIG. 9, there is shown a state diagram of the relay control for the Internet phone in accordance with the present invention. The no power state indicated by the state 1 block 901 is accompanied by a relay position of 1 and the phone is connected to the PSTN . When the relay is in state 1 the telephone 101 can make or receive a PSTN analog call.

The power on default state indicated by the state 2 block 902 is associated with a relay position of 2 and the phone 101 is connected to the SLIC. In this situation the Internet phone 103 is at a "power on" state, with its ring detector monitoring the PSTN for an incoming call and the off-hook detector 804 monitoring the telephone 101 for an outgoing call.

When an incoming analog call state is received, the system goes from state 2 to state 3, block 903, which is associated with a relay position of 1 and the phone 101 is connected to the PSTN. In this state the phone 101 can receive a PSTN call.

When an incoming Internet call is received, the system goes from state 2 to the state 4, block 904, which is associated with a relay position of 2 and the phone is connected to the SLIC. In this state the Internet phone will make an Internet connection to its ISP and then establish an Internet call with the caller party through LDAP services. The Internet connection being made will ring the telephone 101, if the phone is on-hook, and start the audio communication channel after the phone is off-hook.

When the system is in state 2 and the telephone 101 goes off hook, the system switches to the state 5, block 905. This state is associated with a relay position of 1 and the phone is connected to the PSTN. In this state all DTMF digits will be passed to the PSTN central office and the Internet phone processor.

If the outgoing call being made is an analog call, the system goes to state 6, block 906, which is associated with a relay position of 1 and the phone 101 connected to the PSTN. In this state the telephone 101 is used to make an analog phone call.

The Internet dialing state, indicated by the state 7, block 907 is associated with a relay position of 2 and the phone is connected to the SLIC. In this case the Internet phone 103 will initiate the automatic differential dialing sequence of an Internet call. The system switches from state 5 to state 7, when the call being dialed is an Internet call as indicated by the specific DTFM prefix digit or digits.

The Internet call connection state, indicated by the state 8, block 908, is associated with a relay position of 2 and the phone 101 is connected to the SLIC circuit. In this state the Internet phone will make an Internet connection to its ISP and then establish the Internet call with the recipient party through LDAP services. Upon an Internet call connection, the telephone will ring if the "connect and ring back" feature is activated. If the phone is off-hook or goes off hook, the system goes to state 9, block 909, which is associated with a relay position of 2 and the phone is connected to the SLIC. In this state an audio communication channel is connected so that a telephone conversation can take place.

With caller ID services offered by the cental office on the PSTN, the present Internet phone and techniques can accommodate caller ID and caller ID service on the Internet.

For caller ID service on the PSTN, the recipient's central office will send the caller ID (caller's telephone number) between the first and second ringing tone to the recipient's terminal. The recipient's terminal equipment, like a telephone with a caller ID feature, could then decode, store in the on-board memory and then display the ID on the LCD display.

Regarding caller ID service on the Internet by way of the present Internet phone, after the LCD connection is done, the LDAP directory services will send the caller's telephone number or unique identifier to the recipient's terminal. The recipient's terminal equipment, which is either an Internet phone set-top box or personal computer based Internet phone, will receive this number and display it on the LCD panel or monitor, respectively. In addition, this number will be encoded and transmitted between first and second ringing tones by the Internet phone set-top box to the external audio device, such as a telephone set with a caller ID feature, for storage and display.

In the above described system, a caller with an Internet telephone in effect wakes up the Internet processor configured as the recipient's Internet telephone and causes the recipient's Internet phone to automatically connect to its ISP (go on line) and automatically causes an Internet connection to be completed for a telephone conversation between the two parties. This system of alerting or waking up another Internet processor and causing it to go on line can also be used in connection with E-mail and also in connection with gaining access to computer files from a remote location.

When used in connection with E-mail, the calling party sends E-mail in the normal fashion and then initiates a telephone call with the differential dialing sequence to the recipient's Internet processor. As in the case of an Internet telephone call, the differential dialing sequence will be carried out automatically by the caller's Internet processor. The E-mail will be received and stored at the recipient's ISP. As in the case of an Internet telephone call, the caller's differential dialing sequence causes a unique ringing sequence over the telephone connection at the recipient's Internet processor. The recipient's Internet processor monitors and detects the incoming unique ringing sequence. Upon detecting the unique ringing sequence, the recipient's Internet processor automatically connects to its ISP, downloads the E-mail received by the ISP and notifies the user of the recipient's Internet processor that the recipient's processor has received E-mail. The notification is by audible signal or message or by a message on the display device connected to the recipient's Internet processor. Alternatively, the ringing sequence can be used to establish an Internet connection as described above in connection with making an Internet telephone call so that instant messages can be transmitted over the established Internet connection in both directions and be displayed on the display device connected to the personal computer receiving an instant message.

When the invention is used to obtain files from a remote personal computer, the caller automatically establishes an Internet connection between his Internet processor and a remote personal computer in the same manner that an Internet connection is established in making an Internet telephone call as described above so that the caller can access files in the remote personal computer. In this latter application, the caller will cause a unique ringing sequence to be sent to the remote personal computer by telephone and the remote personal computer will monitor the detect receipt of the unique ringing sequence. Upon detecting the unique ringing sequence, the recipient's personal computer will connect to its ISP, the caller's Internet processor will connect to its ISP, and an Internet connection will be automatically completed as described above in connection with the Internet telephone system. Once the connection is made, the caller can send messages to select files on the remote personal computer and command these files to be uploaded and transmitted over the Internet to the caller's Internet processor.

The disclosures of the following U.S. patents are incorporated herein by reference to the extent necessary or desirable to explain the invention: Barris U.S. Pat. No. 5,434,797 granted Jul. 18, 1995; Hollenback, et al. U.S. Pat. No. 5,533,155 granted Jul. 2, 1996; and Fox, et al. U.S. Pat. No. 5,636,216 granted Jun. 3, 1997.

Variations, combinations and permutations of the above as would occur to those of ordinary skill in the art are included in the scope and spirit of the invention. For example, the above described Internet phone 103 can be utilized with a facsimile input device, in lieu of or in combination with the external phone 101 or microphone-speaker 102 set, in conjunction with the automatic dialing and call setups based on the differential ringing sequence of mode 3, or the single ringing interval of mode 4. With regard to the differential ringing sequences described, an interval of the predetermined ringing can be substituted by a duration to a tone detection of a ringing tone by the recipient party's communication equipment. The caller party's communication equipment would be usable to detect the ringing tone of the recipient party's communication equipment through a tone detection by a modem of the caller party's communication equipment as a dynamic way to determine an interval of the predetermined ringing. Also, the above described programs, automatic dialing routines and hardware functions can be configured into a personal computer system that executes the automatic dialing routine to automatically setup a phone call over an Internet connection. The relay and its associated circuits connected to the SLIC in the Internet phone can be used in other peripherals which are connected to the external phone and Personal Computer or other host processors.

What is claimed is:

1. A method for automatically establishing a phone call over an Internet connection, said method comprising the steps of:

notifying automatically, by a dialing routine with a telephone call connection, of an intended phone call over an Internet connection by caller party communication equipment to recipient party communication equipment in response to dialing of said telephone call connection at said caller party communication equipment;

undertaking automatically the Internet connection and then a connection to a directory service on the Internet by each of said caller and recipient party communication equipment;

providing automatically, by said caller party communication equipment, information related to said caller party communication equipment's Internet protocol address and a unique identifier of said caller party communication equipment and unique identifier of said recipient party communication equipment;

providing automatically, by said recipient party communication equipment, information related to said recipient party communication equipment's Internet protocol address and said unique identifier of said recipient party communication equipment;

completing automatically said Internet connection between said caller and recipient party communication equipment for said intended phone call.

2. The method according to claim 1, wherein said dialing routine comprises automatically dialing and completing a telephone call connection to said recipient party communication equipment with a predetermined ringing characteristic detectable by said recipient party communication equipment.

3. The method according to claim 2, wherein said predetermined ringing characteristic is included in a differential ringing sequence which comprises providing a predetermined ringing interval and then disconnecting said telephone connection to said recipient party communication equipment for a predetermined stop interval, and then repeating automatically for a given number of times another telephone connection to said recipient party communication equipment followed by a predetermined ringing characteristic and then disconnecting said another telephone connection.

4. The method according to claim 2, wherein said predetermined ringing characteristic is included in a single ringing interval.

5. The method according to claim 4 wherein the telephone numbers of the recipient and caller are known to each caller by matching up with an entry in a phone book directory in each of said caller and recipient party communication equipment.

6. The method according to claim 1, wherein said step of undertaking said Internet connection comprises undertaking a connection with an Internet service provider and said directory service is a Lightweight Directory Access Protocol (LDAP).

7. The method according to claim 1, wherein said caller party communication equipment comprises at least one of a stand alone personal computer, Internet phone, and gateway.

8. The method according to claim 1, wherein said recipient party communication equipment comprises at least one of a stand alone personal computer, Internet phone, and gateway.

9. The method according to claim 3, wherein said differential ringing sequence comprises parameters based on said predetermined ringing interval, said predetermined stop interval, and number of times said predetermined ringing interval and said predetermined stop interval are repeated, said parameters for said predetermined ringing interval, said predetermined stop interval and said number of times being stored as a look-up table, said parameters being based on said geographic locations of a caller and recipient, and a transmission path.

10. The method according to claim 3, wherein said predetermined ringing characteristic comprises duration of the ringing interval, said caller party communication equipment being usable to detect a ringing interval at said recipient party communication equipment through a tone detector of said caller party communication equipment as a dynamic way to determine said duration of the ringing interval.

11. The method according to claim 1, wherein said caller party communication equipment is configured for attempting an Internet connection with said recipient party communication equipment if a busy tone is received when said caller party communication equipment executes said notifying.

12. The method according to claim 1, wherein said unique identifier comprises a telephone number.

13. The method according to claim 1, further comprising the step of dynamically determining the termination of said differential dialing sequence after said steps of providing automatically.

14. The method as recited in claim 1, further comprising said caller party communication equipment monitoring reception of a dialing sequence by said caller party communication equipment by way of a ring back to said caller party communication equipment.

15. The method according to claim 3, wherein said differential ringing sequence is detected by at least one of a differential timing between a time interval of ringing of each call by said caller and recipient party communication equipment and a differential value between a number of rings of each call by said caller and recipient party communication equipment.

16. The method according to claim 1, wherein said step of completing automatically said Internet connection comprises using the unique identifier associated with recipient party's communication equipment for automatic identification and connection of respective said recipient and caller party communication equipment.

17. The method according to claim 1, wherein said step of completing automatically said Internet connection includes dynamically using a unique identifier associated with recipient party communication equipment to map a finite number of Internet IP addresses to an infinite number of unique identifiers to provide an infinite number of Internet IP addresses virtually assigned to a gateway for an infinite number of terminal devices.

18. The method according to claim 4, wherein said single ringing interval is utilized by said dialing routine when said telephone number of said recipient party communication equipment is known to said caller party communication equipment, and said telephone number of said caller party communication equipment is known to said recipient party communication equipment.

19. A method of making an Internet connection to a remotely located Internet processor comprising applying a predetermined ringing characteristic by telephone line to said remotely located Internet processor, detecting said predetermined ringing characteristic with said remote Internet processor, and establishing a connection to said remotely located Internet processor over the Internet in response to the detecting of said ringing characteristic by said remotely located Internet processor, wherein said predetermined ringing characteristic is applied to said remotely located Internet processor by a caller's Internet processor, and wherein said connection over the Internet is established by said caller's Internet processor furnishing a unique identifier and an IP address of said caller's Internet processor to a directory server and said remotely located Internet processor providing to said directory server a unique identifier and IP address of said remotely located Internet processor.

20. A method as recited in claim 19, wherein said unique identifiers comprise the telephone numbers of said caller's Internet processor and said remotely located Internet processor.

21. A method for establishing a phone call over an Internet connection, said method comprising the steps of:

making an Internet connection by caller party communication equipment intending to establish a phone call connection over said Internet connection with recipient party communication equipment;

providing by said caller party communication equipment information related to said caller party communication equipment's Internet Protocol address and a unique identifier and information related to said recipient party communication equipment's unique identifier to a directory server and knocking server on said Internet connection;

notifying automatically by said knocking server to said recipient party communication equipment of an intended said phone call connection over said Internet connection, said notifying being a dialing routine over a telephone call connection to said recipient party communication equipment;

making an Internet connection by said recipient party communication equipment in response to said recipient party communication equipment detecting said dialing routine by said knocking server;

providing automatically, by said recipient party communication equipment, said recipient party communication equipment's Internet protocol address and said unique identifier to said directory server; and completing automatically said Internet connection between said caller and recipient party communication equipment for said intended phone call.

22. The method according to claim 21, wherein said dialing routine generates a differential ringing sequence detectable by said recipient party communication equipment.

23. The method according to claim 22, wherein said differential ringing sequence comprises providing a predetermined ringing interval and then disconnecting said telephone connection to said recipient party communication equipment for a predetermined stop interval, and then repeating automatically for a given number of times another telephone connection to said recipient party communication equipment followed by said predetermined ringing interval and then disconnecting said another telephone connection.

24. The method according to claim 23, wherein said caller party communication equipment is usable to detect ringing intervals at said recipient party communication equipment through a tone detector of said caller party communication equipment as a dynamic way to determine said predetermined ringing interval.

25. The method according to claim 21, wherein said directory service is a Lightweight Directory Access Protocol (LDAP).

26. The method according to claim 21, wherein said knocking server is located nearer said recipient party communication equipment than said caller party communication equipment on said Internet connection between said caller and recipient party communication equipment.

27. The method according to claim 21, wherein said knocking server is located nearer said caller party communication equipment than said recipient party communication equipment on said Internet connection between said caller and recipient party communication equipment.

28. The method according to claim 22, wherein said differential ringing sequence varies in accordance with at least one of geographic locations of each of said knocking server and recipient party communication equipment and condition of transmission paths in said Internet connection.

29. The method according to claim 28, wherein said differential ringing sequence comprises parameters based on said predetermined ringing interval, said predetermined stop interval, and number of times said predetermined ringing interval and said predetermined stop interval are repeated, said parameters for said predetermined ringing interval, said predetermined stop interval and said number of times being stored in a look-up table at said knocking server, said parameters varying path said geographic locations and said transmission path.

30. The method according to claim 21, wherein said caller party communication equipment comprises at least one of a gateway receiving telephone equipment, a local area network of personal computers, a stand alone personal computer, and an Internet phone.

31. The method according to claim 21, wherein said recipient party communication equipment comprises at least one of a gateway servicing telephone equipment, a local area network of personal computers, a stand alone personal computer, and an Internet phone.

32. The method according to claim 21, wherein said dialing routine comprises a differential dialing sequence.

33. The method according to claim 21, further comprising said recipient party communication equipment detecting a dialing sequence by said caller party.

34. The method according to claim 21, further comprising said caller party communication equipment monitoring reception of a dialing sequence by said caller party communication equipment by way of a ring back routine to said caller party communication equipment.

35. The method according to claim 32, wherein said differential dialing sequence is detected by at least one of a differential timing between a time interval of ringing of each call and a differential value between a number of rings of each call.

36. The method according to claim 21, wherein said step of completing automatically said Internet connection includes dynamically using a telephone number associated with one of said recipient party communication equipment and caller communication equipment to map a finite number of Internet IP addresses to an infinite number of telephone numbers to provide an infinite number of virtual Internet IP addresses for a gateway Intranet, and IP address mapping in an Internet connection.

37. The method according to claim 1, wherein said unique identifier of the recipient party communication equipment submitted by the caller party communication equipment to the directory server is different from the unique identifier submitted by the recipient party communication equipment, said directory server looking up its database to link different unique identifiers to the same recipient party communication equipment.

* * * * *